United States Patent
Hofmeister et al.

(10) Patent No.: US 7,477,847 B2
(45) Date of Patent: Jan. 13, 2009

(54) OPTICAL AND ELECTRICAL CHANNEL FEEDBACK IN OPTICAL TRANSCEIVER MODULE

(75) Inventors: Rudolf J. Hofmeister, Sunnyvale, CA (US); Greta Light, San Mateo, CA (US)

(73) Assignee: Finisar Corporation, Sunnyvale, CA (US)

( * ) Notice: Subject to any disclaimer, the term of this patent is extended or adjusted under 35 U.S.C. 154(b) by 811 days.

(21) Appl. No.: 10/626,965

(22) Filed: Jul. 25, 2003

(65) Prior Publication Data
US 2004/0071389 A1    Apr. 15, 2004

Related U.S. Application Data

(60) Provisional application No. 60/410,509, filed on Sep. 13, 2002.

(51) Int. Cl.
*H04B 10/00* (2006.01)

(52) U.S. Cl. .................. 398/135; 398/136; 398/137; 398/138; 398/139; 398/182; 398/202; 398/25; 398/9; 398/2; 398/3; 398/26; 398/27; 398/33; 398/128; 398/130; 385/89; 385/92; 385/93; 385/14; 385/16; 370/220; 370/222; 370/224; 370/225; 370/227

(58) Field of Classification Search .................. 398/135, 398/136–139, 9, 2, 3, 17, 22, 23, 24, 25, 398/26, 27, 33, 128, 130, 182, 202; 370/1–289; 385/89, 90, 92, 93, 14, 16
See application file for complete search history.

(56) References Cited

U.S. PATENT DOCUMENTS 4,359,553 A    11/1982    Edwards
4,378,451 A    3/1983    Edwards
4,687,924 A    8/1987    Galvin et al.
4,734,914 A    3/1988    Yoshikawa
4,747,091 A    5/1988    Doi (Continued)

FOREIGN PATENT DOCUMENTS

DE    10065034    8/2001

(Continued)

OTHER PUBLICATIONS

*LXT16706/16707 SerDes Chipset*, Intel Products, www.intel.com/design/network/products/optical/phys/lxt16706.htm, Apr. 19, 2002.

(Continued)

*Primary Examiner*—Hanh Phan
(74) *Attorney, Agent, or Firm*—Workman Nydegger

(57) ABSTRACT

Optical transceivers have loopback and pass-through paths for diagnosing transceiver components and optical networks connected to the optical transceiver or for routing data out of the transceiver in a pass-through mode. The loopback paths are selectively configured so that a selected number of the components in the transceiver are included in the loopback path. Where more than one loopback path is present, a network administrator can select which components will be included in a particular test so that, depending on whether a signal is returned on the loopback path as intended, the network administrator can determine which components are operating correctly and which are faulty. The loopbacks can be configured to run on the electrical side of the transceiver from input port to output port or on the optical side from receiver to transmitter. The pass-through paths can be used to connect the transceiver to other devices.

37 Claims, 5 Drawing Sheets

U.S. PATENT DOCUMENTS

| | | | |
|---|---|---|---|
| 4,809,286 A | 2/1989 | Kollanyi et al. |
| 4,916,707 A | 4/1990 | Rosenkranz |
| 4,932,038 A | 6/1990 | Windus |
| 5,019,769 A | 5/1991 | Levinson |
| 5,039,194 A | 8/1991 | Block et al. |
| 5,041,491 A | 8/1991 | Turke et al. |
| 5,268,949 A | 12/1993 | Watanabe et al. |
| 5,287,375 A | 2/1994 | Fujimoto |
| 5,334,826 A | 8/1994 | Sato et al. |
| 5,383,208 A | 1/1995 | Queniat et al. |
| 5,392,273 A | 2/1995 | Masaki et al. |
| 5,396,059 A | 3/1995 | Yeates |
| 5,448,629 A | 9/1995 | Bosch et al. |
| 5,495,358 A | 2/1996 | Bartig et al. |
| 5,516,563 A | 5/1996 | Schumann et al. |
| 5,557,437 A * | 9/1996 | Sakai et al. ............... 398/9 |
| 5,574,435 A | 11/1996 | Mochizuki |
| 5,576,877 A | 11/1996 | Aulet et al. |
| 5,586,123 A * | 12/1996 | Baker .................... 714/716 |
| 5,594,748 A | 1/1997 | Jabr |
| 5,604,758 A | 2/1997 | AuYeung et al. |
| 5,673,282 A | 9/1997 | Wurst |
| 5,706,277 A * | 1/1998 | Klink ...................... 370/220 |
| 5,748,672 A | 5/1998 | Smith et al. |
| 5,761,216 A | 6/1998 | Sotome et al. |
| 5,787,114 A * | 7/1998 | Ramamurthy et al. ....... 375/221 |
| 5,801,866 A | 9/1998 | Chan et al. |
| 5,802,073 A * | 9/1998 | Platt ..................... 714/733 |
| 5,812,572 A | 9/1998 | King et al. |
| 5,854,704 A | 12/1998 | Grandpierre |
| 5,920,414 A * | 7/1999 | Miyachi et al. ............ 398/14 |
| 5,926,303 A | 7/1999 | Giebel et al. |
| 5,953,690 A | 9/1999 | Lemon et al. |
| 5,956,168 A | 9/1999 | Levinson et al. |
| 5,966,395 A | 10/1999 | Ikeda |
| 5,978,417 A | 11/1999 | Baker et al. |
| 5,999,294 A | 12/1999 | Petsko |
| 6,049,413 A | 4/2000 | Taylor |
| 6,055,252 A | 4/2000 | Zhang |
| 6,064,501 A | 5/2000 | Roberts et al. |
| 6,075,634 A | 6/2000 | Casper et al. |
| 6,157,022 A | 12/2000 | Maeda et al. |
| 6,160,647 A | 12/2000 | Gilliland et al. |
| 6,175,434 B1 | 1/2001 | Feng |
| 6,188,059 B1 | 2/2001 | Nishiyama et al. |
| 6,198,558 B1 | 3/2001 | Graves et al. |
| 6,205,505 B1 | 3/2001 | Jau et al. |
| 6,215,565 B1 | 4/2001 | Davis et al. |
| 6,222,660 B1 | 4/2001 | Traa |
| 6,229,788 B1 | 5/2001 | Graves et al. |
| 6,252,692 B1 | 6/2001 | Roberts |
| 6,256,127 B1 | 7/2001 | Taylor |
| 6,272,154 B1 | 8/2001 | Bala et al. |
| 6,292,497 B1 | 9/2001 | Nakano |
| 6,313,459 B1 | 11/2001 | Hoffe et al. |
| 6,317,232 B1 | 11/2001 | Fee et al. |
| 6,384,948 B1 | 5/2002 | Williams et al. |
| 6,423,963 B1 | 7/2002 | Wu |
| 6,469,782 B1 | 10/2002 | Schaepperie |
| 6,473,224 B2 | 10/2002 | Dugan et al. |
| 6,476,949 B1 | 11/2002 | Loh et al. |
| 6,512,617 B1 | 1/2003 | Tanji et al. |
| 6,519,255 B1 | 2/2003 | Graves |
| 6,526,076 B2 | 2/2003 | Cham et al. |
| 6,538,783 B1 | 3/2003 | Stephens |
| 6,570,149 B2 | 5/2003 | Maruyama et al. |
| 6,594,050 B2 | 7/2003 | Jannson et al. |
| 6,631,144 B1 | 10/2003 | Johansen |
| 6,631,146 B2 | 10/2003 | Pontis et al. |
| 6,643,472 B1 | 11/2003 | Sakamoto et al. |
| 6,661,836 B1 | 12/2003 | Dalal et al. |
| 6,661,973 B1 | 12/2003 | Huber et al. |
| 6,665,498 B1 | 12/2003 | Jiang et al. |
| 6,694,462 B1 | 2/2004 | Reis et al. |
| 6,712,527 B1 | 3/2004 | Chan et al. |
| 6,748,181 B2 | 6/2004 | Miki et al. |
| 6,765,445 B2 | 7/2004 | Perrott et al. |
| 6,829,436 B2 | 12/2004 | Koh et al. |
| 6,832,052 B1 | 12/2004 | Marmur |
| 6,909,848 B2 | 6/2005 | Kim et al. |
| 6,937,949 B1 | 8/2005 | Fishman et al. |
| 6,941,077 B2 | 9/2005 | Aronson et al. |
| 6,944,404 B2 | 9/2005 | Lange et al. |
| 6,952,531 B2 | 10/2005 | Aronson et al. |
| 6,956,847 B2 | 10/2005 | Heston et al. |
| 7,010,030 B2 | 3/2006 | Vaidyanathan |
| 7,020,567 B2 | 3/2006 | Fishman et al. |
| 7,024,059 B2 | 4/2006 | Kurchuk |
| 7,031,615 B2 | 4/2006 | Gentile |
| 7,058,310 B2 | 6/2006 | Aronson et al. |
| 7,099,382 B2 * | 8/2006 | Aronson et al. ............ 375/219 |
| 7,110,668 B2 | 9/2006 | Gerstel et al. |
| 7,155,127 B2 | 12/2006 | Akimoto et al. |
| 7,245,638 B2 | 7/2007 | Agazzi |
| 7,308,060 B1 | 12/2007 | Wall |
| 2001/0046242 A1 | 11/2001 | Kawakami et al. |
| 2001/0046243 A1 | 11/2001 | Schie |
| 2002/0021468 A1 * | 2/2002 | Kato et al. ................. 359/152 |
| 2002/0027688 A1 | 3/2002 | Stephenson |
| 2002/0034222 A1 | 3/2002 | Buchwald et al. |
| 2002/0060324 A1 | 5/2002 | Liou et al. |
| 2002/0075981 A1 | 6/2002 | Tang et al. |
| 2002/0080447 A1 | 6/2002 | Fells et al. |
| 2002/0097468 A1 | 7/2002 | Mecherle et al. |
| 2002/0097682 A1 | 7/2002 | Enam et al. |
| 2002/0101641 A1 | 8/2002 | Kurchuk |
| 2002/0105982 A1 | 8/2002 | Chin et al. |
| 2002/0110157 A1 | 8/2002 | Jorgenson et al. |
| 2002/0114061 A1 | 8/2002 | Naito et al. |
| 2002/0129379 A1 | 9/2002 | Levinson et al. |
| 2002/0131132 A1 | 9/2002 | Tanaka et al. |
| 2002/0149812 A1 | 10/2002 | Hong et al. |
| 2002/0149821 A1 | 10/2002 | Aronson et al. |
| 2002/0163960 A1 | 11/2002 | Blodgett et al. |
| 2002/0176518 A1 | 11/2002 | Xu |
| 2002/0181519 A1 | 12/2002 | Vilhelmsson et al. |
| 2002/0181573 A1 | 12/2002 | Dohmen et al. |
| 2002/0181894 A1 | 12/2002 | Gilliand et al. |
| 2003/0002108 A1 | 1/2003 | Ames et al. |
| 2003/0011847 A1 | 1/2003 | Dai et al. |
| 2003/0039207 A1 | 2/2003 | Maeda et al. |
| 2003/0053170 A1 | 3/2003 | Levinson et al. |
| 2003/0110509 A1 | 6/2003 | Levinson et al. |
| 2003/0113118 A1 | 6/2003 | Bartur |
| 2003/0169790 A1 | 9/2003 | Chieng et al. |
| 2003/0210917 A1 | 11/2003 | Stewart et al. |
| 2003/0219085 A1 | 11/2003 | Endres et al. |
| 2004/0033079 A1 | 2/2004 | Sheth et al. |
| 2004/0076113 A1 | 4/2004 | Aronson et al. |
| 2004/0076119 A1 | 4/2004 | Aronson et al. |
| 2004/0091028 A1 | 5/2004 | Aronson et al. |
| 2004/0120720 A1 | 6/2004 | Chang et al. |
| 2004/0153913 A1 | 8/2004 | Fishman et al. |
| 2004/0202210 A1 | 10/2004 | Thornton |
| 2004/0240886 A1 | 12/2004 | Aronson et al. |
| 2004/0253003 A1 | 12/2004 | Farmer et al. |
| 2005/0031352 A1 | 2/2005 | Light et al. |
| 2005/0058455 A1 | 3/2005 | Hosking et al. |
| 2005/0111845 A1 | 5/2005 | Nelson et al. |
| 2005/0169585 A1 | 8/2005 | Aronson et al. |
| 2005/0213982 A1 | 9/2005 | Weber |
| 2005/0281193 A1 | 12/2005 | Hofmeister et al. |

2007/0031153 A1  2/2007  Aronson et al.

FOREIGN PATENT DOCUMENTS

| EP | 0437161 | 6/1996 |
|---|---|---|
| EP | 0745868 | 12/1996 |
| EP | 1471671 | 10/2004 |
| EP | 02704344 | 10/2004 |
| EP | 04017254 | 10/2004 |
| GB | 2 406 988 A | 4/2005 |
| GB | 0600513.6 | 5/2006 |
| GB | 0600513.6 | 11/2006 |
| GB | 0600513.6 | 4/2007 |
| JP | 58140175 | 8/1983 |
| JP | 62124576 | 6/1987 |
| JP | 62235975 | 10/1987 |
| JP | 62281485 | 12/1987 |
| JP | 402102589 | 4/1990 |
| JP | 404023373 | 1/1992 |
| JP | 06209209 | 7/1994 |
| JP | 08-321825 | 3/1996 |
| JP | 09162811 | 6/1997 |
| JP | 11-275016 | 8/1999 |
| KR | 10-2006-7001640 | 12/2006 |
| WO | WO9800893 | 1/1998 |
| WO | WO9800943 | 1/1998 |
| WO | 0203226 | 5/2002 |
| WO | WO02063800 | 8/2002 |
| WO | WO2004098100 | 11/2004 |

OTHER PUBLICATIONS

*LXT35401 XAUI-to-Quad 3.2G Transceiver*, Intel Products, www.intel.com/design/network/products/optical/phys/lxt35401.htm, Apr. 19, 2002.
Texas Instruments User's Guide, *TLK2201 Sedes EVM Kit Setup and Usage*, Mixed Signal DSP Solutions, Jul. 2000.
Texas Instruments User's Guide, *TLK1501 Serdes EVM Kit Setup and Usage*, Mixed Signal Products, Jun. 2000.
National Semiconductor DS92LV16 Design Guide, *Serializing Made Simple*, Feb. 2002.
Vaishali Semiconductor, *Fibre Channel Transceiver*, VN16117, MDSN-0002-02, Aug. 9, 2001.
Fairchild Semiconductor, Application Note 77, *CMOS, the Ideal Logic Family*, Jan. 1983.
Analog Target Specification, Annex 48B, Published by IEEE New York, May 2001, pp. 6-14.
U.S. Appl. No. 10/629,301, filed Jul. 28, 2003, Aronson et al.
U.S. Appl. No. 10/697,395, filed Oct. 30, 2003, Hofmeister et al.
"Application Note: T2525/26/27," copyright 2003 by Atmel Corporation.
"IR Receiver ASSP: T2525," copyright 2003 by Atmel Corporation.
"IR Receiver for Data Communication: U2538B," copyright 2003 by Atmel Corporation.
"Low-Voltage Highly Selective IR Receiver IC: T2527", copyright 2002 by Atmel Corporation.
Finisar Corp., "App. Note AN-2025: Using the Finisar GBIC 12C Test Diagnostics Port," 1998.
Hausdorf, Reiner, "Mobile Transceiver Measurements with Radiocommunication Service Monitor CMS," News from Rohde & Schwarz, 127, IV, 1989, pp. 4-7.
Maeda, Noriyuki "Notification of Reason(s) for Refusal," Japanese Patent Application No. JP2002-563630, Nakamura, M. et al., Jul. 13, 2005.
Manchester Encoding [retrieved Nov. 12, 2003 from the Internet] http://www.erg.abdn.ac.uk/users/gorry/course/phy-pages/man.html.
Optiport SFF BiDi- Transceiver 100 Mbit/s, 1310 nm Tx/1550 nm Rx, Infineon Technologies, Jun. 22, 2004, pp. 1-14.
Webopedia.com: 12C [retrieved Nov. 11, 2003 from the Internet] http://www.webopedia.com/TERM/I/12C.html.
Webopedia.com: MAC Address [retrieved Oct. 15, 2003 from the Internet] http://www.webopedia.com/TERM/M/MAC_address.html.
Webopedia.com: Public-Key Encryption [retrieved Oct. 15, 2003 from the Internet] http://www.webopedia.com/TERM/p/public_key_cryptography.html.
Webopedia.com: The 7 Layers of the OSI Model [retrieved Oct. 15, 2003 from the Internet] http://webopedia.internet.com/quick_ref/OSI_Layers.asp.
Yi Cai et al., "Jitter testing for gigabit serial communication transceivers," Jan.-Feb. 2002, IEEE Design and Test of Computers, vol. 19, Issue 1, pp. 66-74.
Michael Green, et al., "Mixing it up with OC-192 CMOS Transceivers," CommsDesign, An EE Times Community, 8 pgs, May 3, 2006, available at: http://www.commsdesign.com/main/2000/12/0012feat6.htm.
Dallas Semiconductor, "HFA-01.0: 2.5Gbps SDH/Sonet Fiber Optic Chipset," 4 pages, Oct. 10, 2000, available at: http://www.maximic.com/appnotes.cfm/appnote_number/713/1n/en.
Dallas Semiconductor, "MAX3872 Multirate Clock and Data Recovery with Limiting Amplifier," 2 pages, Mar. 30, 2003, available at: http://www.maximic.com/quick_view2.cfm/qv_pk/3705.
Huiqing Zhong and Stephen I. Long, "Monothic Clock and Data Recovery Chip for 1 OGB/S Fiber Communications Systems," 4 pages, 1997-98.
Giga an Intel Company, "2.5 Gbit/s Clock and Data Recovery GD16546B," 9 pages, Jul. 31, 2001.
XFP MSA Group, Ultra Small, 10-Gigabit Module Slashes Cost, Power and Footprint of Telecommunications and Datacommunications Equipment, Press Release, Irvine, California, Mar. 4, 2002. [World Wide Web page]. Available: www.xfpmsa.org/cgi-bin/pressrelease1.cgi.
XFP MSA Group New Module to Slash Cost, Power and Size of Telecommunications and Data Communications Equipment, Press Release, Costa Mesa, California, Jul. 22, 2002, [World Wide Web page]. Available: www.xfpmsa.org/cgi-bin/pressrelease3.cgi.
Finisar XFP Achieves 300 m Transmission on Legacy Multimode Fiber, Finisar News Release, Sunnyvale, California Sep. 17, 2003. [World Wide Web page}. Available: http://investor.finisar.com/ReleaseDetail.
XFP MSA Group, About the 10 Gigabit Small Form Factor Pluggable (XFP) Multi Source Agreement (MSA) Group. Feb. 11, 2004. [World Wide Web page]. Available: www.xfpmsa.org/cgi-bin/home.cgi.
Kaminishi, K. et al., Si Bipolar 3.3V Transmitter/Receiver IC Chip Set for 1 Gb/s 12-Channel Parallel Optical Interconnects, IEEE International Solid-State Circuits Conference, ISSCC, Digest of Technical Papers, 1999 Paper WP 22.1.
A. Ghiasi, "XFP The Module Based 10Gig Universal Serial Interconnect XFI," presentation material, Apr. 8, 2002.
U.S. Appl. No. 10/420,027, filed Jan. 25, 2006, Office Action.
U.S. Appl. No. 10/420,027, filed Sep. 7, 2006, Office Action.
U.S. Appl. No. 10/420,027, filed May 16, 2007, Office Action.
U.S. Appl. No. 10/420,027, filed Dec. 12, 2007, Office Action.
U.S. Appl. No. 10/420,027, filed Jun. 25, 2008, Notice of Allowance.
U.S. Appl. No. 10/629,228, filed Jan. 24, 2006, Office Action.
U.S. Appl. No. 10/629,228, filed Sep. 1, 2006, Office Action.
U.S. Appl. No. 10/629,228, filed May 24, 2007, Office Action.
U.S. Appl. No. 10/629,228, filed Jan. 3, 2008, Office Action.
U.S. Appl. No. 10/629,301, filed Aug. 9, 2007, Office Action.
U.S. Appl. No. 10/629,301, filed Apr. 1, 2008, Office Action.
U.S. Appl. No. 10/629,302, filed Jun. 14, 2007, Office Action.
U.S. Appl. No. 10/629,302, filed May 2, 2008, F. Office Action.
U.S. Appl. No. 10/629,725, filed Oct. 17, 2005, Office Action.
U.S. Appl. No. 10/629,725, filed Apr. 11, 2006, Notice of Allowance.
U.S. Appl. No. 10/697,395, filed Jan. 24, 2006, Office Action.
U.S. Appl. No. 10/697,395, filed Sep. 27, 2006, Office Action.
U.S. Appl. No. 10/697,395, filed May 9, 2007, Office Action.
U.S. Appl. No. 10/697,395, filed Nov. 15, 2007, Office Action.
U.S. Appl. No. 10/697,395, filed May 30, 2008, Notice of Allowance.
U.S. Appl. No. 10/884,334, filed Jun. 12, 2007, Office Action.
U.S. Appl. No. 11/073,452, filed Dec. 31, 2007, Office Action.
U.S. Appl. No. 11/118,172, filed Mar. 25, 2008, Office Action.

* cited by examiner

OPTICAL AND ELECTRICAL CHANNEL FEEDBACK IN OPTICAL TRANSCEIVER MODULE

CROSS-REFERENCE TO RELATED APPLICATIONS

This application claims the benefit of U.S. Provisional Application No. 60/410,509, filed Sep. 13, 2002, and entitled "Improved Clock and Data Recovery-Retiming Transceiver Integrated Chip," which is hereby incorporated by reference.

BACKGROUND OF THE INVENTION

1. The Field of the Invention

The present invention relates generally to optical transceiver modules, and more particularly, to loopback and pass-through paths within optical transceiver modules for redirecting input electrical or optical signals.

2. The Relevant Technology

The proliferation and significance of networking technology is well known. The ever-increasing demand for network bandwidth has resulted in the development of technology that increases the amount of data traveling across a network. Advancements in modulation techniques, coding algorithms and error correction have drastically increased rates of this data. For example, a few years ago, the highest rate that data could travel across a network was at approximately one Gigabit per second (Gb/s). This rate has increased ten-fold today where data travels across Ethernet and SONET (Synchronous Optical Network) networks at upwards of 10 Gb/s. For instance, the XFP (10 Gigabit Small Form Factor) Pluggable Module Multi-Source Agreement is directed at transceivers operating at approximately 10 Gb/s.

FIG. 1 illustrates a typical configuration of an optical data transmission system 100. In system 100, a transceiver module 102 is coupled to a network 104 and to a host device 106 such as a media access controller ("MAC") card or SONET framer. The transceiver module 102 has a receiver 108 that is coupled to network interface 110. The receiver receives an optical input from network 102 and converts into an electrical output signal, which after additional optional processing in transceiver module 102 is relayed to host 106. The transceiver module 102 also has a transmitter 112 that is coupled to network interface 114. The transmitter 112 receives an electrical input from host 106 via additional optional devices in transceiver module 102 and creates an optical signal which is then relayed into network 104 through network interface 114. The optical signal is then passed to transceiver module 120, which may be similar to transceiver module 102. Transceiver module 120 interacts with network 104 and remote host 122 similarly to the manner in which transceiver module 102 interacts with network 104 and host 106. Thus, for example, an electrical signal can be generated by host 106, transmitted to transceiver module 102 and therein converted to an optical signal. The optical signal is relayed at high-speed into and through network 104 and then directed to transceiver module 120. Transceiver module 120 receives the optical signal, converts it into an electrical signal, and passes the optical signal on to remote host 120. Of course, data can be transmitted in the opposite direction or between different transceivers and hosts as well.

Additional devices are typically included in transceiver modules, such as serializer/deserializers (SERDES). Thus, in operation, a serial optical data stream received by the transceiver module 102 is converted to an electrical serial data stream by the receiver 108. This electrical serial data stream is deserialized by SERDES into four channels and transmitted via a parallel bus to host 106 for processing.

A similar deserialization occurs on the transmit side of the transceiver module 102 for the same reasons described above. In particular, a deserialized electrical data stream is transferred from the host 106 to another SERDES via parallel bus. This SERDES serializes this electrical signal. The transmitter 112 converts the serial electrical signal to an optical signal and transmits it onto the network.

One challenge in operation system 100 is in the debugging and maintenance operations of the systems. When data transmission between host 106 and remote host 120 fails, it is often impossible to known precisely where the failure has occurred without sending a network administrator into the field in order to test various links in the system. For example, the network administrator may need to individually isolate and test each of host 106, data fiber or bus 122, transceiver module 102, optical fiber 124, any of a number of devices on network 104, optical fiber 126, transceiver module 120, data fiber or bus 128, and remote host 120. Obviously this can be a daunting and expensive task if the source of the system failure is not quickly detected.

One device or feature that is often used in system diagnostics is a loopback. A loopback is a signal path inserted in the system to route a data signal back to its source or an accompanying device. For example, network administrators often manually tap into a fiber to route a signal back to the source or another detector. If data can be successfully sent from the source and received at a detectable endpoint, a network administrator can verify that the components in the signal path are operating correctly. Through one or more loopbacks along different signal paths a network administrator can identify where in a system a system failure is occurring. In addition to identifying the source of system failures, such loopbacks are also conventionally used to test devices when downstream optical components are not yet connected. For example, it may be desirable to verify that a device is operating correctly by a burn-in process during manufacturing before the device is sold.

However, the cost of sending a network administrator to manually insert a loopback into a networked system each time a test is necessary can be expensive. Similarly, the cost and delay associated with testing devices via temporary loopbacks during device assembly is also undesirable. It would therefore represent an advance in the field of data transmission to provide methods and devices to assist in quickly detecting the source(s) of system failure and to evaluate device reliability without requiring the manual insertion and removal of loopback paths to test each component of an optical system.

BRIEF SUMMARY OF THE INVENTION

In general, embodiments of the invention relate to loopback paths and modes in optical transceivers for diagnosing devices and systems in optical networks. In particular, various embodiments of the invention have signal paths that can be remotely selected to route incoming signals away from their normal paths in order to determine whether certain paths and devices are functioning properly.

Other embodiments of the invention provide pass-through paths by which signals received from either the electrical or optical inputs are rerouted to a pass-through port that is configured for routing the signals in a "pass-through mode" for sending the signal to another device. Such an application may be used, for example, to daisy-chain transceivers or send signals to selected devices for analysis.

The various embodiments of the invention can be generally divided into two categories which are referred to herein as "optical loopback paths" and "electrical loopbacks paths." As the name implies, optical loopbacks receive an electrical signal from an optical source, such as an optical receiver. Rather than forward the signal to the transceiver output port as is normal, the optical loopback path redirects the signal to the transceiver's transmitter or an additional output port, for example. Similarly, electrical loopbacks receive an electrical signal through an electrical source, such as a transceiver input port, and redirect the electrical signal into the transceiver output port rather than to the transmitter, as would be typical.

A particular benefit of embodiments of the present invention is providing multiple loopback paths that may be used to test multiple components and data paths on both the transceiver module and on an attached network in order to identify with greater particularity the specific source device failures.

Accordingly, one embodiment of the invention provides an optical transceiver including an input port for receiving an incoming electrical signal, an output port for relaying an outgoing electrical signal, and a loopback path for selectively coupling an incoming electrical signal from the input port to the output port. According to another embodiment of the invention an optical transceiver includes an optical transmitter, an optical receiver, and a loopback path for selectively coupling an electrical output signal from the optical receiver to the transmitter input. According to yet another embodiment of the invention an optical transceiver includes both loopback paths for selectively coupling an incoming electrical signal from the input port to the output port and loopback paths for selectively coupling an electrical output signal from the optical receiver to the transmitter input.

In each of the foregoing embodiments the transceiver may include one or more of a post amplifier, a laser driver, a receiver eye opener, a transmitter eye opener, and other transceiver devices on an integrated chip. The loopbacks may be configured to pass-through some, none, or all of the post amplifier, laser driver, receiver eye opener, transmitter eye opener, and other transceiver devices in order to selectively diagnose or test the components.

According to yet other embodiments of the invention an optical transceiver includes an optical transmitter, an optical receiver for generating electrical output signal from an optical input signal, a transceiver input port for receiving an electrical input signal, a transceiver output port, a pass-through port, and one or more pass-through paths. The pass-through paths may be configured for selectively coupling the electrical input signal from the input port to the pass-through port in a pass-through mode or for selectively coupling the electrical output signal from the optical receiver to the pass-through port. The pass-through paths can be used to divert signals from their normal paths and route them to other devices, such as transceivers.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
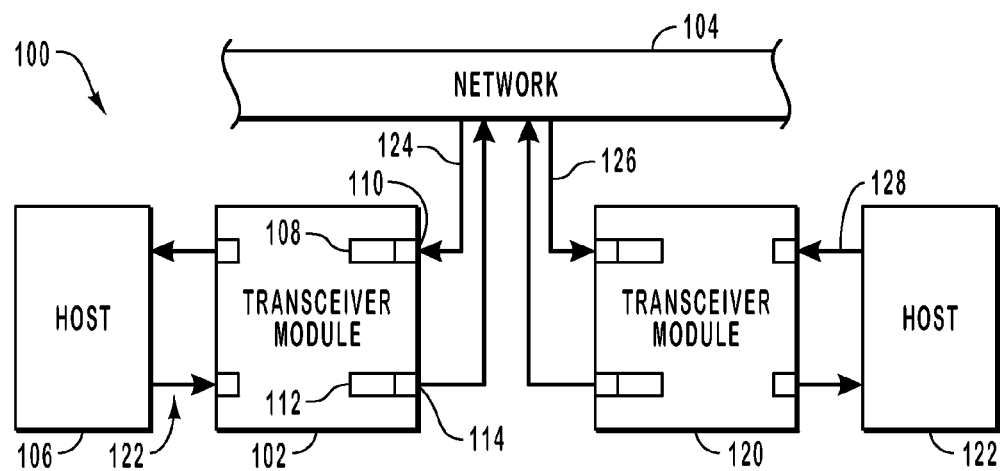
FIG. 1 illustrates a prior art optical data transmission system.

In general, embodiments of the invention are concerned with loopback paths and modes in optical transceivers for diagnosing devices and systems in optical networks. In particular, this invention relates to various embodiments in which signal paths are provided and can be remotely selected to route incoming signals away from their normal paths in order to determine whether certain paths and devices are functioning properly.

The various embodiments of the invention can be generally divided into two categories which are referred to herein as "optical loopbacks" and "electrical loopbacks." The terms "optical loopbacks" and "electrical loopbacks" refer to the source of the data signal that is rerouted and not to the actual nature of the signal in the loopback path. Accordingly, it will be understood by those skilled in the art that an optical loopback path may include electrical signal transmission. As the name implies, optical loopbacks receive a signal from an optical source, such as an optical receiver. Rather than forward the signal to the transceiver output port as is normal, the optical loopbacks redirect the signal to the transceiver's transmitter or an additional output port, for example. Similarly, electrical loopbacks receive an electrical signal through a transceiver input port and redirect the electrical signal into the transceiver output port rather than to the transmitter, as would be typical.

Use of the loopback paths can be selectable with a control line or digital control, for example. In some combinations, these features allow the transceiver to perform self-test or diagnostics of the data link, or diagnostics of the host system.

A particular benefit of embodiments of the present invention is providing multiple loopback paths that may be used to test multiple components and data paths on both the transceiver module and on an attached network in order to identify with greater particularity the specific source device failures.

Other embodiments of the invention provide pass-through paths by which signals received from either the electrical or optical inputs are rerouted to a distinct pass-through port that is configured for routing the signals in a "pass-through mode" for sending the signal to another device. Such an application may be used, for example, to daisy-chain transceivers or send signals to selected devices for analysis.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
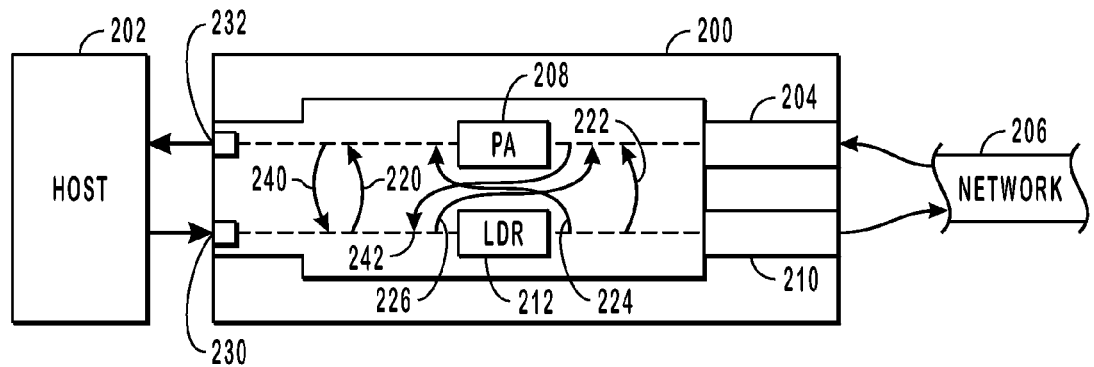
FIG. 2 is an illustration of a system including a transceiver module according to an embodiment of the present invention.

Referring now to FIG. 2, depicted is a schematic depiction of a transceiver module 200 (e.g., an XFP 10 Gb/s module) having a connection to a host 202 according to an embodiment of the present invention. The receive path includes a receiver 204 coupled to a network 206. The receiver 204 may be, for example, a receiver optical sub-assembly ("ROSA") that receives and converts an optical signal to an electrical signal. Attached to the ROSA may be a post-amplifier 208 that amplifies the electrical signal to an appropriate power level.

The transmit path includes a transmitter 210 coupled to network 206. The transmitter 210 includes a transmitter optical sub-assembly ("TOSA") that converts an electrical signal to an optical signal and transmits it onto a network. Also included is a laser driver 212 that controls a laser within the TOSA and the modulation of data within the electrical signal onto the optical signal. The laser within the TOSA is also biased to the proper operating current using a dedicated biasing and control circuit that may be contained within or outside of the laser driver.

As illustrated in FIG. 2, loopback paths can be configured in various arrangements in order to divert a data signal from its normal path. FIG. 2 illustrates examples of potential loopback paths, but one of skill in the art can appreciate that other loopback paths are possible. The loopback paths can route the data signal through desired transceiver components prior to directing the signal out of the transceiver. Accordingly, in the depicted embodiment of FIG. 2, loopback path 220 routes an incoming electrical data signal from the incoming transceiver port 230 back to the outgoing transceiver port 232 without passing it through laser driver 212 or post analyzer 208. Loopback path 222 routes the data signal through both laser driver 212 and post analyzer 208 prior to directing the data signal to the outgoing transceiver port. Loopback path 224 routes the data signal through laser driver 212 but not post analyzer 208 prior to directing the data signal to the outgoing transceiver port. Finally, loopback path 226 routes the data signal through post analyzer 208 but not laser driver 212 prior to directing the data signal to the outgoing transceiver port. Of course, directing the signal through different devices on the integrated circuit does not necessarily mean that the signal is modified by the devices and the signal may therefore pass transparently therethrough.

Similarly, as depicted in FIG. 2, optical loopback paths can also be configured in various arrangements in order to route an incoming optical signal (converted to electrical) through desired transceiver components prior to directing the signal back to out of the transceiver. Accordingly, in the depicted embodiment, loopback path 240 routes an incoming data signal from the receiver 204 to transmitter 210 via post analyzer 208 and laser driver 212. Loopback path 242 routes the data directly to laser driver 212 without passing through post analyzer 208 prior to directing the data signal to transmitter 210.

Thus, depending on the design of the particular transceiver, a network administrator can select which stages of the transceiver a data signal will pass-through prior to being looped back out of the transceiver. The network administrator can thereby determine which stages of the transceiver are operating properly in passing through the signal as directed.

As depicted, in the presently discussed embodiment the disclosed loopback paths 220, 222, 224, 226, 240, and 242, as well as the post amplifier 208 and the laser driver 212, are integrated onto a single integrated chip. However, it will be understood by those skilled in the art that the foregoing can be separated among multiple chips. For example it is conventional to provide post amplifier 208 and laser driver 212 on separate chips. In such an embodiment the above loopback paths would incorporate conductive paths to connect the chips.

Figure 3A:
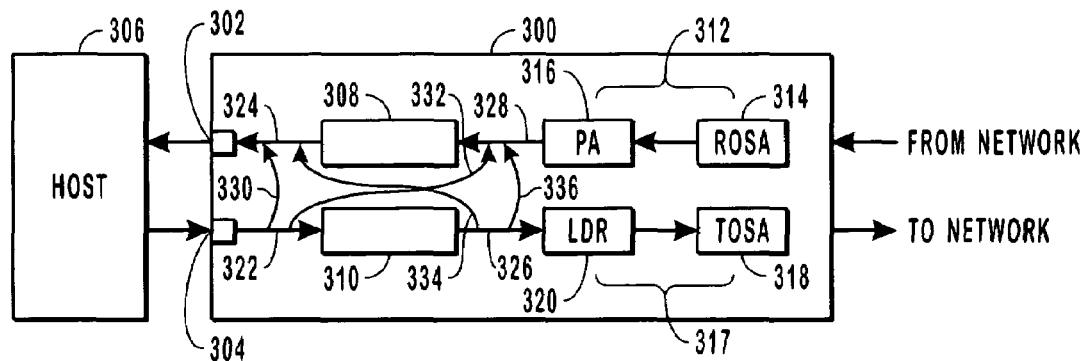
FIG. 3A is another illustration of a system including a transceiver module according to an embodiment of the present invention.

Of course, loopback paths can be directed through or around other devices within an optical transceiver as desired. Referring now to FIG. 3A, depicted is a schematic depiction of a system including a transceiver module 300 (e.g., a 10 Gb/s XFP transceiver) and a host 306. The transceiver module 300 includes dual eye openers 308, 310. The eye openers 308, 310 are designed to clean up high frequency jitter, e.g., "open" the eye diagram of serial data streams for optical transceivers. The eye openers 308, 310 may also have low power modes (power down modes) that are enabled via a control pin, or by control through a digital bus or two wire interface. The eye openers 308, 310 may also have BERT functions whereby a BERT engine within the eye opener generates data and/or an error detector matches up incoming data to a predetermined pattern to check for errors in the data stream.

In the depicted embodiment, the receive path includes a receiver 312 coupled to a network and a receiver eye opener 308. The receiver 312 includes a receiver optical sub-assembly ("ROSA") 314 that receives and converts an optical signal to an electrical signal. The receiver 312 also includes a post-amplifier 316 that amplifies the electrical signal to an appropriate power level. One skilled in the art will recognize that eye opener 308 and ROSA 314 may be manufactured and packaged using multiple methods. For example, the eye opener 308 and ROSA 314 may be integrated within a single ASIC or manufactured separately.

The transmit path includes a transmitter 317 coupled to a network and a transmitter eye opener 310. The transmitter eye opener 310 recovers degraded clock and data values from an electrical signal that travels from the host 306 via serial path 304 (e.g., 10 G/s transmission line). As the electrical signal may degrade along this path 304, eye opener 310 compensates for this degradation and sends the electrical signal to the transmitter 317. The depicted transmitter 317 includes a transmitter optical sub-assembly ("TOSA") 318 that converts an electrical signal to an optical signal and transmits it onto a network. The transmitter 317 also preferably includes a laser driver 320 that controls a laser within the TOSA 318 and the modulation of data within the electrical signal onto the optical signal. The laser within the TOSA 318 is also biased to the proper operating current using a dedicated biasing and control circuit that may be contained within or outside of the laser driver. The transmitter 317 may include eye opener 310 depending on the particulars of the packaging and design chosen.

This transceiver module 300 allows serial connections 302, 304 between the transceiver module 300 and the host 306. In particular, the receiver and transmitter eye openers 308, 310 compensate for signal degradation that occurs on these serial connections 302, 304 at high data rates, such as a data rate of about 10 Gb/s or higher.

As previously described with respect to post analyzer 208 and laser driver 212, loopback paths can be configured to direct an optical signal through neither, one, or both of dual eye openers 308, 310 on its way between serial input port 3(04 and serial output port 302. Similarly, as also previously described with respect to post analyzer 208 and laser driver 212, optical loopback paths can be configured to direct an optical signal through neither, one, or both of dual eye openers 308, 310 on it way between receiver 312 and transmitter 317. In some combinations, these features allow the transceiver to perform self-test, or diagnostics of the data link, or diagnostics of the host system.

More particularly, a first loopback path 330 goes from the input 322 of the transmitter eye opener 310 to the output 324 of the receiver eye opener 308. This first loopback 330 allows the host system 306 to check the function of the host board and check that the transceiver module 300 is correctly plugged into its connector and is powered up properly. Because this first loopback 330 is integrated within the module 300, an installer can quickly determine whether the transceiver module 300 is properly installed or whether a failure occurred within the transceiver module 300 or host 306.

A second loopback path 332 is integrated with dual eye openers according to another embodiment of the present invention, passing from the input 322 of the transmitter eye opener 310 to the input 328 of the receiver eye opener 308. This second loopback path 332 allows the host system 306 to check that the receiver eye opener 308 is operating properly and that the transceiver module 300 is properly plugged into its connector and powered up properly. Because the second loopback 332 is integrated within the transceiver module 300, a manufacturer can quickly test the integrity of the receiver eye opener 308 prior to shipment as well as allowing a network administrator to easily check the receiver eye opener 308 after installation of the transceiver module 300.

Also depicted in FIG. 3A is a third loopback path 334 integrated with dual eye openers according to an embodiment of the present invention. Third loopback path 334 travels from the output 326 of transmitter eye opener 310 to the output 324 of receiver eye opener 308. This third loopback 334 allows the host system 306 to check that the transmitter eye opener 310 is operating properly and that the transceiver module 300 is properly plugged into its connector and powered up properly. Because the third loopback path 334 is integrated within the transceiver module 300, a manufacturer can quickly test the integrity of the transmitter eye opener 310 prior to shipment as well as allowing a network administrator to easily check the transmitter eye opener 310 after installation of the transceiver module 300.

Also depicted in FIG. 3A is a fourth loopback path 336 integrated with dual eye openers according to an embodiment of the present invention. The loopback path 324 travels from the output 326 of transmitter eye opener 310 to the input 328 of receiver eye opener 308. This fourth loopback 334 allows the host system 306 to check that the transmitter eye opener 310 is operating properly, that the receiver eye opener 308 is operating properly, and that the transceiver module 300 is properly plugged into its connector and powered up properly. Because the loopback path 336 is integrated within the transceiver module 300, a manufacturer can quickly test the integrity of the receiver eye opener 308 and the transmitter eye opener 310 prior to shipment as well as allowing a network administrator to easily check the receiver and transmitter eye openers 308, 310 after installation of the transceiver module 300.

Figure 3B:
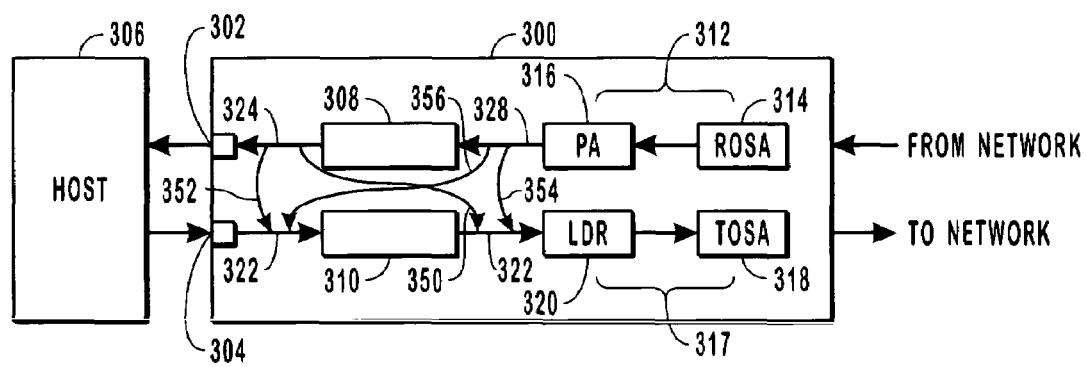
FIG. 3B is yet another illustration of a system including a transceiver module according to an embodiment of the present invention.

FIG. 3B illustrates additional examples of loopback paths in a transceiver module 300. The loopback paths illustrated in FIG. 3 are integrated with the dual eye openers 308, 310 in this embodiment. These loopbacks paths enable the testing of the optical front end components on the transceiver module 300. The loopback path 350 travels from the output 324 of the receiver eye opener 308 to the output 326 of the transmitter eye opener 310. This loopback 350 allows for testing of the front end components on the transceiver module 300, the receiver eye opener 308, and an optical data path on a network.

A loopback path 352 travels from the output 324 of the receiver eye opener 308 to the input 322 of the transmitter eye opener 310. This loopback path 352 allows for testing of the front end components on the transceiver module 300, the receiver eye opener 308, the transmitter eye opener 310, and an optical data path on a network. A loopback path 354 is from the input 328 of the receiver eye opener 308 to the output 326 of the transmitter eye opener 310. This loopback path 354 allows for testing of the front end components on the transceiver module 300 and an optical data path on a network. An loopback path 356 is from the input 328 of the receiver eye opener 308 to the input 322 of the transmitter eye opener 310. This loopback path 3546 allows for testing of the front end components on the transceiver module 300, the transmitter eye opener 310, and an optical data path on a network.

The above-described loopback paths are examples of loopbacks that may be integrated in the transceiver module 300 and is not meant to include all possible loopback paths. Additional loopbacks may also be integrated within the transceiver module 300 to test other data paths and/or components depending upon the included components. Such paths can be configured to include or exclude, by way of example only, post analyzer 316, laser driver 320, and other devices or components in the transceiver.

By way of example, FIGS. 4A-5B present more detailed views of various embodiments of loopback paths in optical transceivers having dual eye opener ICs. As with the previously discussed embodiments, some components that are transparent to the data path during normal operation are omitted in the present discussion for clarity.

Figure 4A:
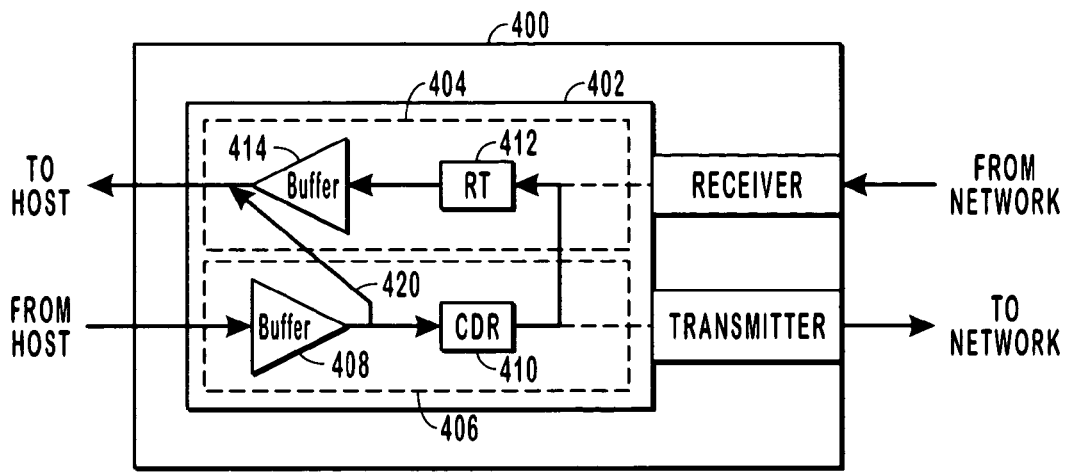
FIG. 4A is a further illustration of a system including a transceiver module according to an embodiment of the present invention.

Referring now to FIG. 4A, a dual eye opener IC 402 on transceiver module 400 includes receiver eye opener 404 and transmitter eye opener 406. In the loopback path, an input of a buffer 408 receives the data path from the host into transmitter eye opener 406 and an input of a clock and data recovery device ("CDR") 410 receives the data path from an output of the buffer 408. In receiver eye opener, an input of a retimer ("RT") 412 receives the data path from an output of the CDR 410 and an input of a buffer 414 receive the data path from an output of the RT 412 and relays the data back to the host.

One benefit of the herein disclosed loopback paths is that the host may verify that a specific combination of components are responding. In other embodiments, the data path is varied to reduce the number of components in the data path, thereby leading to a more exacting verification of component response. For instance, in one embodiment, a loopback path 420 includes coupling the input of the buffer 408, rather than the output of RT 412, to the input of buffer 414. Thus, the buffer 408, CDR 410, and RT 412 are removed from the data path allowing for testing of the remaining components. A failure from the first configuration along with a success from the second configuration would reveal that the first buffer is not responding.

Thus, from the foregoing examples it is apparent that the number and variety of loopback paths can be easily configured, in view of the description herein, to isolate or include each of buffer 408, CDR 410, RT 411, and buffer 414 as desired. The above-described loopback examples are examples that are not meant to include all possible implementations.

Figure 4B:
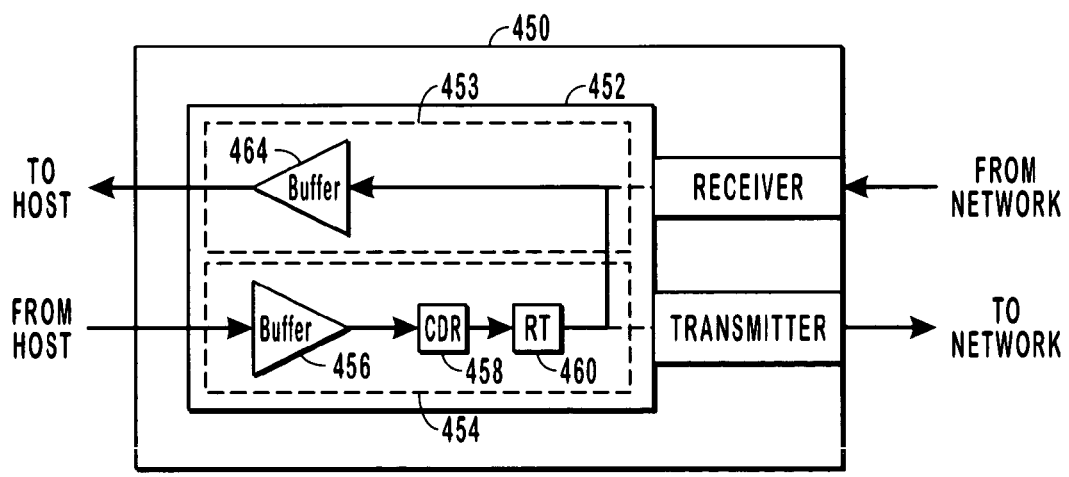
FIG. 4B is another illustration of a system including a transceiver module according to an embodiment of the present invention.

FIG. 4B is an embodiment of yet another loopback path data through a dual eye opener 452 on an transceiver module 450. In the transmitter eye opener 454, an input of a buffer 456 receives the data path from the host, an input of a CDR 458 receives the data path from an output of the buffer 456, and an input of RT 460 receives the data path from an output of the CDR 458. In the receiver eye opener 453, an input of a buffer 464 receives the input from an output of the RT 460 and relays the data back to the host. As with FIG. 4A, the above-described loopback implementation is an example that is not meant to include all possible implementations. Thus, it is apparent that the number and variety of loopback paths can be easily configured, in view of the description herein, to include or exclude each of buffer 456, CDR 458, RT 460, and buffer 464 as desired.

Figure 5A:
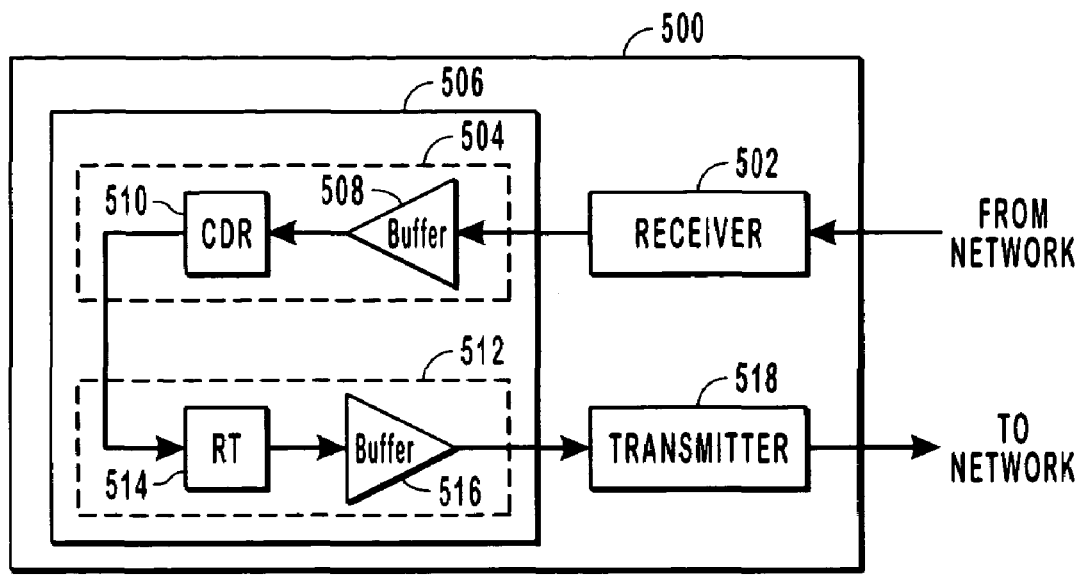
FIG. 5A is yet another illustration of a system including a transceiver module according to an embodiment of the present invention.
Figure 5B:
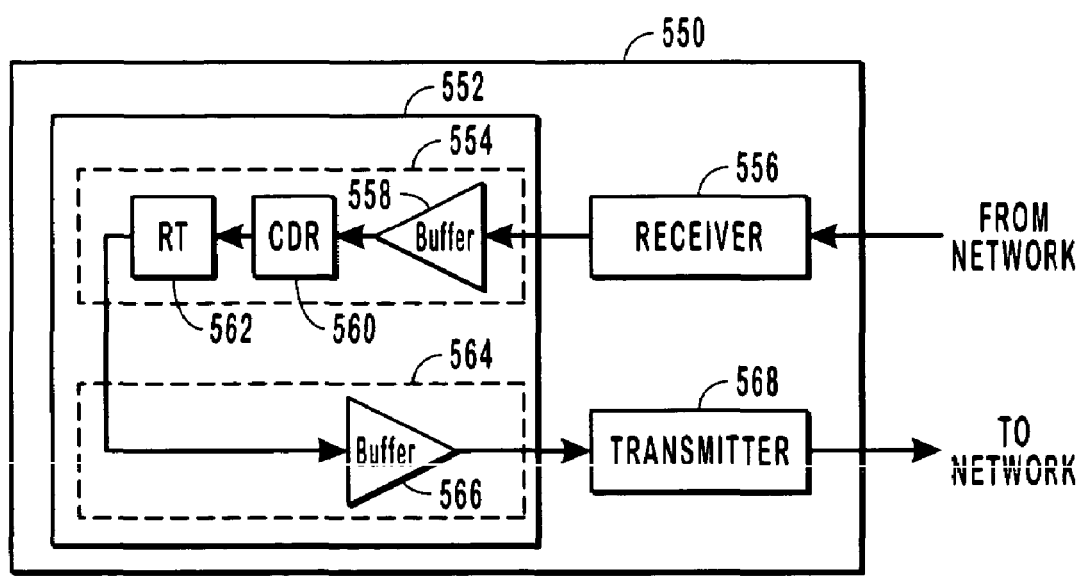
FIG. 5B is a further illustration of a system including a transceiver module according to an embodiment of the present invention.

FIGS. 5A and 5B depict embodiments of optical loopback paths of a dual eye opener IC. Referring to FIG. 5A, in transceiver module 500 an input of the receiver 502 receives the data path from a network. In the receiver eye opener 504 on dual eye opener IC 506, an input of a buffer 508 receives the data path from an output of receiver 502, and an input of a CDR 510 receives the data path from an output of the buffer 508. In the transmitter eye opener 512, an input of a RT 514 receives the data path from an output of the CDR 510 and an input of a buffer 516 receives the input from an output of the RT 514. An input of a transmitter 518 receives the data path from an output of the buffer 516 and transmits the data to the network as an optical signal. As with FIGS. 4A and 4B, the above-described loopback implementation is an example that is not meant to include all possible implementations. Thus, it is apparent that the number and variety of loopback paths can be easily configured, in view of the description herein, to isolate or include each of buffer 508, CDR 510, RT 514, and buffer 516 as desired.

FIG. 5B is an embodiment of yet another loopback path data path of a dual eye opener IC Chip 552 on a transceiver module 550. An input of a receiver 556 receives the data path from the network. In a receiver eye opener 554, an input of a buffer 558 receives the data path from an output of the receiver 556, an input of a CDR 560 receives the data path from an output of the buffer 558, and an input of an RT 562 receives the data path from an output of the CDR 560. In a transmitter eye opener 564, an input of a buffer 566 receives the input from an output of the RT 562. An input of a transmitter 568 finally receives the data path from an output of the buffer 566 and transmits the data to the network as an optical signal. As with the previous embodiments, the above-described loopback implementation is an example that is not meant to include all possible implementations. Thus, it is apparent that the number and variety of loopback paths can be easily configured, in view of the description herein, to isolate or include each of buffer 558, CDR 560, RT 562, and buffer 566 as desired.

Figure 6:
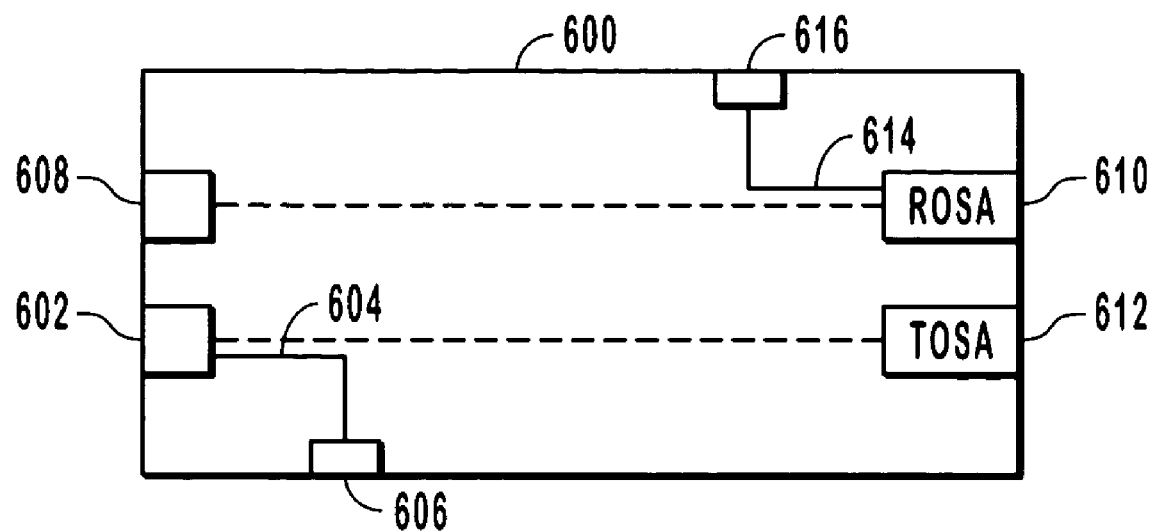
FIG. 6 is another illustration of a system including a transceiver module according to an embodiment of the present invention.

Referring now to FIG. 6, according to another embodiment of the invention, rather than direct loopback paths back to a transceiver output port or a transmitter, the paths can be directed to other port(s) and thereby be used as pass-through paths. For example, a data signal could be received in a transceiver module 600 at input port 602 and be routed on pass-through path 604 to a pass-through port 606 rather than to output port 608 or transmitter 612. Similarly, an optical pass-through can be performed by routing an optical data signal received at receiver 610 (converted to an optical data signal to an electrical data signal) to pass-through path 614 and on to pass-through port 616 rather than to output port 608 or transmitter 612. In this manner the transceiver module can be used to transparently pass a data signal on to another location in, for example, a daisy chain formation. The use of the transceiver module to send the data signal through pass-through paths to pass-through ports can be controlled remotely by a network administrator as desired.

The optical loopback paths of embodiments of the invention may be enabled by a remote user or device by a variety of devices or methods. For example, a host may transmit a signal to an optical device, such as a transceiver module, to place the transceiver module in a loopback mode or in a pass-through mode so that all subsequently transmitted signals are routed through loopback or pass-through paths as indicated by the signal. The transceiver can then be returned to its normal mode of operation by a subsequent signal. Alternatively, the transceiver may have a filter that analyzes incoming optical side or electrical side signals to identify data "flags" that indicate that a certain set of data should be routed through a loopback path or a pass-through path. A host can then attach the flag to a data packet that it is desired to route through a loopback path or a pass-through path.

One such method for remotely diagnosing the operation of devices in an optical network includes receiving a control signal at an optical device, placing the optical device in a signal rerouting mode (such as a loopback mode or pass-through mode) in response to the control signal, and selecting a signal path on the optical device whereby an incoming data signal is routed from the input to a second output. The selected signal path may be selected, for example, from a loopback path wherein the second output returns the data signal to its source and a pass-through path wherein the second output comprises a pass-through port that directs the data signal to another optical device. In one embodiment the optical device comprises an optical transceiver, the input comprises an electrical input port, the first output comprises an optical transmitter, and the second output comprises an electrical output port. In another embodiment the optical device comprises an optical transceiver, the input comprises an optical receiver, the first output comprises an electrical output port, and the second output comprises an optical transmitter.

One advantage of using the present inventive loopbacks is for use in host network debugging operations when a signal is not reaching a remote host. A user can identify whether a transmitted signal is reaching a transceiver module without having to send a network administrator physically out to open up the fiber, insert a connector, run tests, and then put it all back together. Rather, a network administrator can, via software, remotely send a signal and, depending on the status of the network, receive the signal back and evaluate the results.

Another advantage of using the herein disclosed loopbacks is that, whereas during normal optical communications between hosts strict adherence to a designated software protocol is required the use of the herein disclosed loopbacks may eliminate the need for a specific software protocol because there is no host to host communication. Hence, in those loopback paths that transparently pass the signal, the protocol is not important.

Yet another aspect of embodiments of the invention is using the herein described loopback paths to place the transceiver in a reflector mode. Network engineers can, for example, place the transceiver in a reflector mode and ping out to a transceiver even if the transceiver is shut down. This may be desirable if a user wants to keep a portion of a system running even if other portions, such as the optical transceiver, are shut down. The transceiver would thus just operate as a reflector, sending the data back to the source. Use of the transceiver as a reflector would be advantageous, for example, during system maintenance.

While the present invention has been described in detail in regards to a transceiver, it will be understood from the above description that embodiments of the present invention may be applied to a transponder as well.

Embodiments of the invention may also be particularly useful, for example, in manufacturing applications. During the manufacture of optical systems which use optical transceivers, the optical system is typically tested, or "burned in" before a transceiver is attached. A burn in is generally defined as running a new device for a period of time, often at high temperatures, in order to pinpoint early failures. This is often performed at various stages of production by attaching temporary loopback cables to perform the burn-in test. Unfortunately, these temporary loopbacks not only add an additional step in the manufacturing process, but they may break, resulting in an additional concern in that a manufacturer is not certain whether it is the optical system or the loopback that is faulty. Accordingly, the presently disclosed transceivers with integrated loopback paths can be used in place of the loopback cables to perform a burn in test of optical systems up to, but not including the optical transceiver. Rather than attach external loopback cables, a manufacturer can attach a transceiver and instruct the data signals to be sent through the loopback paths in the transceiver. Thus, because the transceiver is transparent to the system, the reliability of the optical system can be evaluated as it is tested in isolation without adding temporary cables.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver for use in connecting a host with an optical network, the transceiver comprising:
    an input port that receives electrical signals from a host, the input port being in communication with an optical transmitter for generating an optical signal for transmission to the optical network;
    an output port that sends electrical signals to the host, the output port being in communication with an optical receiver that receives optical signals from the optical network and converts the optical signals into electrical signals;
    a loopback path for selectively coupling an incoming electrical signal from the input port to the output port;
    a pass-through port operable to send the incoming electrical signal to a device external to the transceiver; and
    a pass-through path configured to bypass the optical transmitter in selectively coupling the incoming electrical signal from the input port to the pass-through port.

2. The transceiver of claim 1, further comprising an integrated chip comprising a post amplifier and a laser driver, wherein the loopback path comprises a conductive path on the integrated chip.

3. The transceiver of claim 2, wherein the loopback path passes through at least one of the post amplifier and the laser driver.

4. The transceiver of claim 2, wherein the loopback path does not pass through the post amplifier or the laser driver.

5. The transceiver of claim 2, wherein the integrated chip further comprises a receiver eye opener and a transmitter eye opener.

6. The transceiver of claim 5, wherein the loopback path passes through at least one of the receiver eye opener and the transmitter eye opener.

7. The transceiver of claim 5, wherein the loopback path does not pass through the receiver eye opener or the transmitter eye opener.

8. The transceiver of claim 5, wherein:
    the receiver eye opener comprises at least one of a clock and data recovery, an RT, and a buffer;
    the transmitter eye opener comprises at least one of a clock and data recovery, an RT, and a buffer; and
    the loopback path passes through at least one of the at least one of a clock and data recovery, an RT, and a buffer on the receiver eye opener and the at least one of a clock and data recovery, an RT, and a buffer on the transmitter eye opener.

9. The transceiver of claim 8, further comprising multiple loopback paths such that a network administrator can selectively route the electrical signal through one or more of the at least one of a clock and data recovery, an RT, and a buffer on the receiver eye opener and the at least one of a clock and data recovery, an RT, and a buffer on the transmitter eye opener in order to evaluate different components on the transceiver.

10. The transceiver of claim 1, wherein the transceiver can be remotely controlled to place the transceiver in one of:
    a normal mode such that incoming electrical signals are routed from the input port to an optical transmitter which generates an optical output in response to the electrical input signal;
    a loopback mode such that incoming electrical signals bypass the optical transmitter and are routed to the output port; and
    a pass-through mode such that incoming electrical signals are selectively coupled from the input port to the pass-through port.

11. The transceiver of claim 1, wherein the loopback path is configured for diagnosing the operation of a host, the transceiver, and optical devices interconnecting the host and the transceiver.

12. The transceiver of claim 1, wherein the transceiver is configured to be daisy-chained with another transceiver by way of the pass-through port.

13. The transceiver of claim 1, wherein the pass-through port is configured to send signals to selected devices for analysis.

14. A transceiver for use in connecting an optical network to a host, the transceiver comprising:
- an optical transmitter generating an optical output in response to an electrical input signal applied to an input of the optical transmitter;
- an optical receiver generating an electrical output signal at a receiver output in response to an optical input;
- a loopback path for selectively coupling the electrical output signal from the optical receiver to the input of the optical transmitter;
- a pass-through port operable to send the electrical output signal to a device external to the transceiver; and
- a pass-through path configured to selectively couple the electrical output signal from the optical receiver to the pass-through port without converting the electrical output signal into an optical signal.

15. The transceiver of claim 14, wherein the loopback path is configured for bypassing a transceiver output port and coupling the electrical output signal to the input of the optical transmitter.

16. The transceiver of claim 14, wherein the loopback path is configured for diagnosing the operation of a remote host, the transceiver, and optical devices interconnecting the remote host and the transceiver.

17. The transceiver of claim 14, further comprising an integrated chip comprising a post amplifier and a laser driver, wherein the loopback path comprises a conductive path on the integrated chip.

18. The transceiver of claim 17, wherein the loopback path passes through at least one of the post amplifier and the laser driver.

19. The transceiver of claim 17, wherein the integrated chip further comprises a receiver eye opener and a transmitter eye opener.

20. The transceiver of claim 19, wherein the loopback path passes through at least one of the receiver eye opener and the transmitter eye opener.

21. The transceiver of claim 19, wherein the loopback path does not pass through the receiver eye opener or the transmitter eye opener.

22. The transceiver of claim 19, wherein:
- the receiver eye opener comprises at least one of a clock and data recovery, an RT, and a buffer;
- the transmitter eye opener comprises at least one of a clock and data recovery, an RT, and a buffer; and
- the loopback path passes through at least one of the at least one of a clock and data recovery, an RT, and a buffer on the receiver eye opener and the at least one of a clock and data recovery, an RT, and a buffer on the transmitter eye opener.

23. The transceiver of claim 22, further comprising multiple loopback paths such that a network administrator can selectively route the electrical output signal through one or more of the at least one of a clock and data recovery, an RT, and a buffer on the receiver eye opener and the at least one of a clock and data recovery, an RT, and a buffer on the transmitter eye opener in order to evaluate different components on the transceiver.

24. The transceiver of claim 14, wherein the transceiver can be remotely controlled to place the transceiver in one of:
- a normal mode such that an electrical output signal is routed from the optical receiver to a transceiver output port;
- a loopback mode such that an electrical output signal is routed from the optical receiver to the optical transmitter; and
- a pass-through mode such that an electrical output signal is selectively coupled from the optical receiver to the pass-through port.

25. The transceiver of claim 14, wherein the transceiver is configured to be daisy-chained with another transceiver by way of the pass-through port.

26. The transceiver of claim 14, wherein the pass-through port is configured to send signals to selected devices for analysis.

27. A transceiver for use in connecting a host with an optical network, comprising:
- an input port for receiving an electrical input signal from a host;
- an optical transmitter generating an optical output in response to the electrical input signal applied to a transmitter input;
- an optical receiver generating an electrical output signal at a receiver output in response to an optical input;
- an output port for relaying the electrical output signal to the host;
- a first loopback path for selectively coupling the electrical input signal from the input port to the output port;
- a second loopback path for selectively coupling the electrical output signal from the optical receiver to the optical transmitter
- a pass-through port for sending electrical signals to a device separate from the transceiver; and
- at least one of:
  - a first pass-through path configured to bypass the optical transmitter in selectively coupling the electrical input signal from the input port to the pass-through port in a pass-through mode; and
  - a second pass-through path configured to selectively couple the electrical output signal from the optical receiver to the pass-through port in a pass-through mode.

28. The transceiver of claim 27, wherein the first loopback path is configured for bypassing the optical transmitter and directing the electrical input signal to the output port and the second loopback path is configured for bypassing the output port and directing the electrical output signal to the optical transmitter.

29. The transceiver of claim 27, further comprising an integrated chip comprising a post amplifier and a laser driver, wherein the first and second loopback paths comprise conductive paths on the integrated chip.

30. The transceiver of claim 27, further comprising multiple loopback paths such that a network administrator can selectively route the electrical output signal or the electrical input signal through one or more of the at least one of a clock and data recovery, an RT, and a buffer on the receiver eye opener and at least one of a clock and data recovery, an RT, and a buffer on the transmitter eye opener in order to evaluate different components on the transceiver.

31. The transceiver of claim 27, wherein the transceiver can be remotely controlled to place the transceiver in one of:

a normal mode such that an electrical output signal is routed from the optical receiver to a transceiver output port and an electrical input signal is routed from the input port to the optical transmitter;

a loopback mode such that an electrical output signal is routed from the optical receiver to the optical transmitter and/or an electrical input signal is routed from the input port to the output port; and a pass-through mode such that an electrical output signal is selectively coupled from the optical receiver to the pass-through port and/or an incoming electrical signal is selectively coupled from the input port to the pass-through port.

32. The transceiver of claim 27, wherein the transceiver is configured to be daisy-chained with another transceiver by way of the pass-through port.

33. The transceiver of claim 27, wherein the pass-through port is configured to send signals to selected devices for analysis.

34. A transceiver, comprising:
- an optical transmitter capable of generating an optical output in response to an electrical input signal applied to a transmitter input;
- an optical receiver capable of generating an electrical output signal at a receiver output in response to an optical input;
- a transceiver input port for receiving an electrical input signal;
- a transceiver output port for receiving the electrical output signal and communicating the electrical output signal to a host system;
- a pass-through port operable to send the electrical input signal to a device external to the transceiver; and
- a pass-through path configured to bypass the optical transmitter in selectively coupling the electrical input signal from the input port to the pass-through port in a pass-through mode without converting the electrical input signal into an optical signal.

35. The transceiver of claim 34, wherein the transceiver can be remotely controlled to place the transceiver in one of:
- a normal mode such that incoming electrical signals are routed from the input port to the optical transmitter for transmission to a remote host as an optical output;
- a loopback mode such that an electrical input signal is routed from the input port to the output port; and
- a pass-through mode such that the electrical input signal bypasses the optical transmitter and is routed to the pass-through port.

36. A transceiver, comprising:
- an optical transmitter generating an optical output in response to an electrical input signal applied to a transmitter input;
- an optical receiver generating an electrical output signal at a receiver output in response to an optical input;
- an input port;
- an output port for receiving the electrical output signal and communicating the electrical output signal to a host system;
- a pass-through port for sending electrical signals to a device external to the transceiver; and
- a pass-through path for selectively coupling the electrical output signal from the optical receiver to the pass-through port in a pass-through mode without converting the electrical output signal into an optical signal.

37. The transceiver of claim 36, wherein the transceiver can be remotely controlled to place the transceiver in one of:
- a normal mode such that the electrical output signal is routed from the optical receiver to the output port for transmission to a host;
- a loopback mode such that an electrical output signal is routed from the optical receiver to the optical transmitter; and
- a pass-through mode such that the electrical output signal is selectively coupled from the optical receiver to the pass-through port.

* * * * *

UNITED STATES PATENT AND TRADEMARK OFFICE
CERTIFICATE OF CORRECTION

PATENT NO.        : 7,477,847 B2
APPLICATION NO.   : 10/626965
DATED             : January 13, 2009
INVENTOR(S)       : Hofmeister et al.

Page 1 of 2

It is certified that error appears in the above-identified patent and that said Letters Patent is hereby corrected as shown below:

Drawings
Sheet 2, replace Figure 3B with the figure depicted below, wherein the second instance of "322" has been changed to --326--

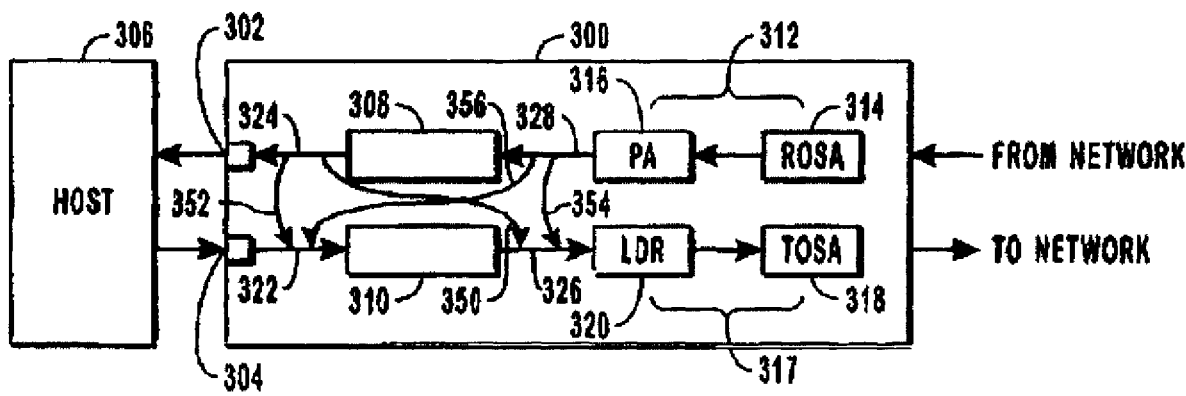

FIG. 3B

Column 1
Line 40, change "receiver" to --receiver 108--
Line 41, change "network 102" to --network 104--
Line 41, change "converts into" to --converts it into--
Line 60, change "remote host 120" to --remote host 122--

Column 2
Line 9, change "network" to --network 104--
Line 11, change "systems" to --system 100--
Line 13, change "known" to --know--
Line 17, change "data fiber or bus 122" to --remote host 122--

Signed and Sealed this
Twenty-second Day of February, 2011

David J. Kappos
*Director of the United States Patent and Trademark Office*

CERTIFICATE OF CORRECTION (continued)
U.S. Pat. No. 7,477,847 B2

Column 3
Line 48, change "generating electrical output" to --generating an electrical output--

Column 6
Line 4, change "post analyzer 208" to --post amplifier 208--
Line 6, change "post analyzer 208" to --post amplifier 208--
Lines 8-9, change "post analyzer 208" to --post amplifier 208--
Line 10, change "transceiver port" to --transceiver port 232--
Line 11, change "post analyzer 208" to --post amplifier 208--
Line 12, change "transceiver port" to --transceiver port 232--
Line 21, after "back" remove [to]
Lines 23-24, change "post analyzer 208" to --post amplifier 208--
Lines 25-26, change "post analyzer 208" to --post amplifier 208--

Column 7
Lines 19-20, change "laser driver" to --laser driver 320--
Line 29, change "post analyzer 208" to --post amplifier 208--
Line 32, change "serial input port 3(04" to --serial input port 304--
Line 34, change "post analyzer 208" to --post amplifier 208--

Column 8
Line 29, change "FIG. 3" to --FIG. 3A--
Line 50, change "loopback path 3546" to --loopback path 356--
Line 60, change "post analyzer 316" to --post-amplifier 316--

Column 9
Line 29, change "RT 411" to --RT 412--

Column 11
Line 45, change "bum-in test" to --burn-in test--
Line 52, change "bum in test" to --burn-in test--

Column 14
Line 36, change "transmitter" to --transmitter;--